July 4, 1961 — J. J. GRENIER — 2,990,728
TRANSMISSION GEAR
Filed July 22, 1959 — 3 Sheets-Sheet 1

INVENTOR.
Joseph J. Grenier

July 4, 1961     J. J. GRENIER     2,990,728
TRANSMISSION GEAR

Filed July 22, 1959     3 Sheets-Sheet 3

INVENTOR

Joseph J. Grenier

United States Patent Office 2,990,728
Patented July 4, 1961

2,990,728
TRANSMISSION GEAR
Joseph J. Grenier, 9631 Cortada St., El Monte, Calif.
Filed July 22, 1959, Ser. No. 828,740
2 Claims. (Cl. 74—780)

This invention relates to transmission systems and more particularly to a reversible marine transmission system.

It is an object of the present invention to provide a marine transmission system that is particularly useful with fifty to sixty horsepower engines on various types of boats and the like.

Another object of the present invention is to provide a completely reversible transmission system that can be conveniently operated from the front end of a marine engine crank shaft.

Still another object of the present invention is to provide a reversible marine transmission system of the above type having self contained reduction gearing for both forward and reverse drive so as to provide for the smooth and uninterrupted transmission of power from the engine to the screw.

An additional object of the present invention is to provide a hydraulic controlled reversible marine transmission system which will automatically provide for forward and reverse movement, as well as to effectively prevent rotation of the screw when the transmission is in a neutral state.

Other objects of the invention are to provide a marine transmission system bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
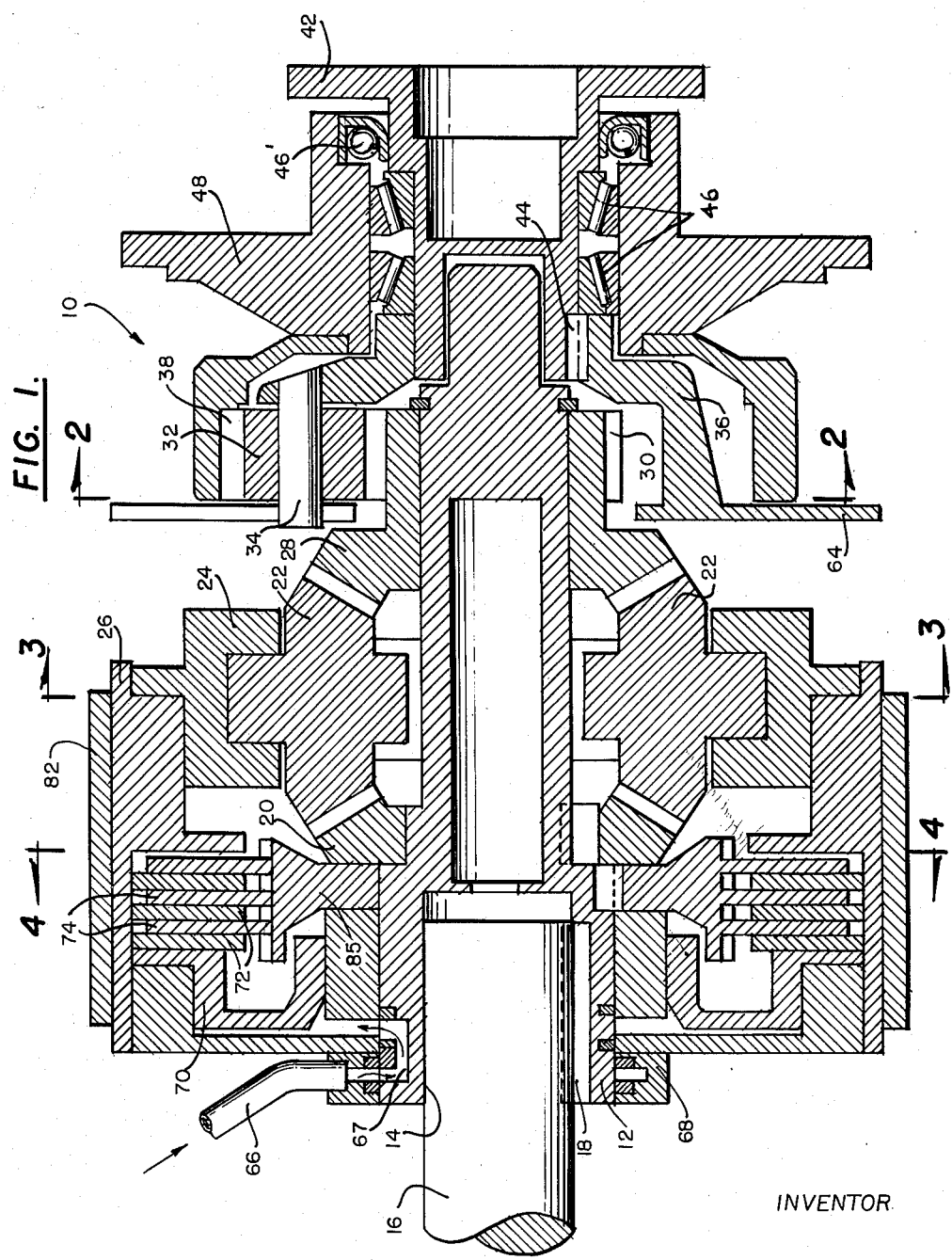
FIGURE 1 is a longitudinal cross sectional view of a marine transmission system made in accordance with the present invention.
Figure 2:
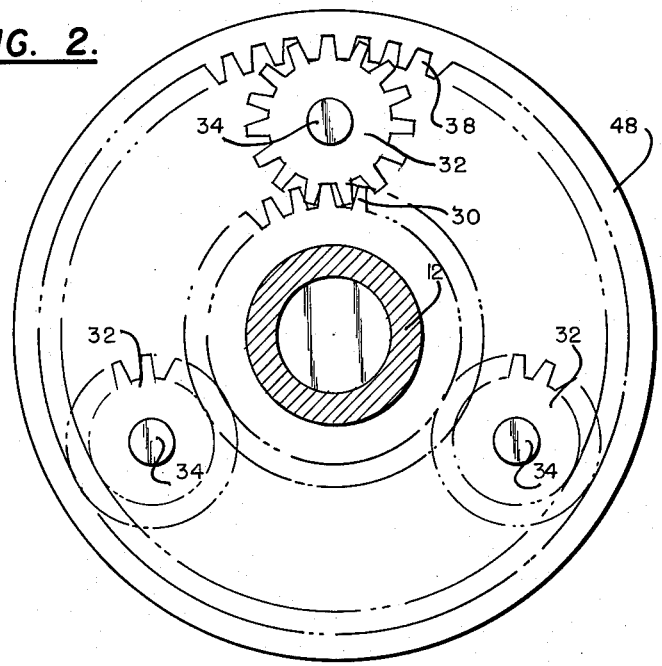
FIGURE 2 is a transverse cross sectional view taken along line 2—2 of FIGURE 1.
Figure 3:
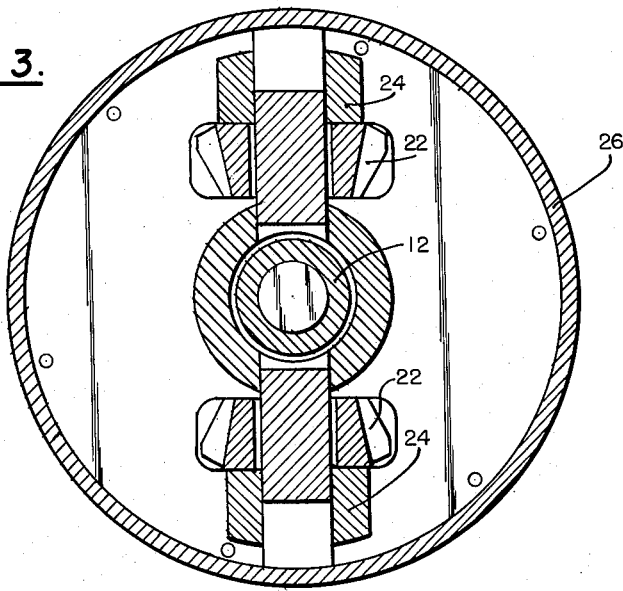
FIGURE 3 is a transverse cross sectional view taken along line 3—3 of FIGURE 1.
Figure 4:
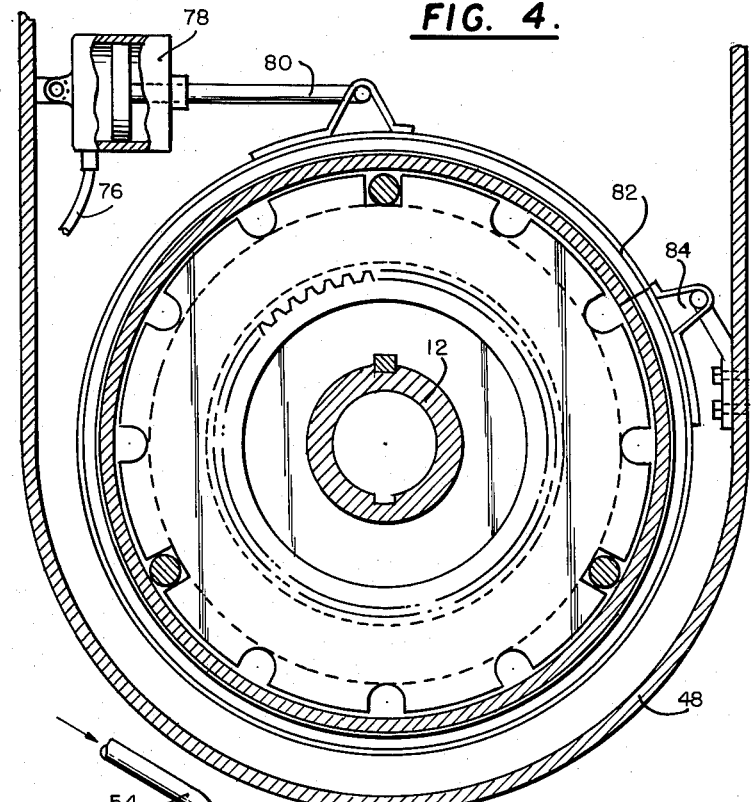
FIGURE 4 is a transverse cross sectional view taken along line 4—4 of FIGURE 1.

Referring now more in detail to the drawing, a reversible marine transmission system 10 made in accordance with the present invention is shown to include a main driving member in the form of a drive shaft 12 having a longitudinal bore 14 at one end which receives the front end of a marine engine crank shaft 16. A key 18 effectively locks the crank shaft 16 to the drive shaft 12 for continuous rotation therewith.

A first bevel gear 20 is keyed to the drive shaft 12, while a second bevel gear 28 is rotatably supported thereupon. A spider 24 rotatably supported upon the drive shaft 12 intermediate the first and second bevel gears further rotatably supports a plurality of additional bevel gears 22, all of which are in meshing engagement with both the first bevel gear 20 and second bevel gear 28. The second bevel gear 28 includes an integral sun gear 30 that is in meshing engagement with the planetary gear pinions 32 that are rotatably supported upon transverse pins 34 carried by the planet cage 36. These planetary pinions are in further meshing engagement with a stationary ring gear 38 which is fixed to an element 48 of the engine mounting.

A main driven member 42 is rotatably mounted on the element 48 of the engine casing by means of a roller bearing assembly 46 and is adapted to be driven by the planet cage 36 through a connecting key 44, as will be hereinafter more fully described. A spring loaded oil seal 46' is provided on the member 42 ahead of the bearing 46.

Figure 5:
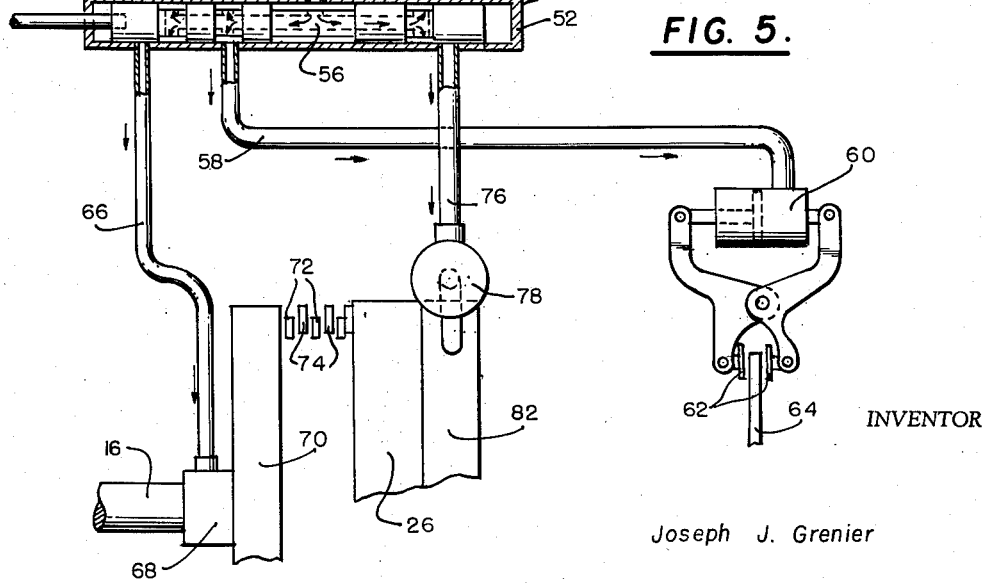
FIGURE 5 is a schematic diagram of a hydraulic control system forming a part of the present invention.

Reference is now specifically made to FIGURE 5 of the drawing which illustrates the hydraulic control system for the transmission unit. This hydraulic control unit 50 includes a casing 52 having a fluid delivery line 54 communicating with the interior thereof for supplying fluid under pressure thereto. A manually controlled slide 56 is slidably supported within the casing 52 for reciprocating longitudinal movement between predetermined adjusted positions. In the neutral position of the slide 56 equally spaced from opposite ends of the casing 52, the fluid supplied under pressure from the delivery line 54 is, in turn, supplied to a connecting line 58 which carries the fluid to a hydraulic piston and cylinder unit 60 that operates a pair of brake pads 62 that are disposed on the opposite sides of an idling brake disc 64 that is integrally connected to the planet cage 36. Thus, in a neutral position, the main driven member 42 is prevented from rotating such as when the boat is at the dock, so as to prevent continued rotation of the screw at idling speeds. In response to complete retraction of the slide 56, the fluid supplied under pressure from the delivery line 54 is carried by means of another connecting line 66 into the duct 67 of a collar 68 carried by the drive shaft 12, which duct 67 further communicates with a pressure slide member 70 concentric with the drive shaft 12 and in abutting pressure engagement with a group of friction discs 72 that are interleaved with similar friction discs 74 axially spaced on the splined periphery of a wheel 85 which is keyed to the drive shaft 12. The first group of friction discs 72 are keyed with the spider extension 26 of the additional bevel gears 22. Thus, in response to a supply of pressurized fluid acting against the member 70, the spider 24 is effectively locked for rotation with the drive shaft 12 so that power is transmitted directly between the first bevel gear 20 and second bevel gear 28 through the stationary additional bevel gears 22. This power is then transmitted from the second bevel gear 28 through the planetary gear system 30, 32, 38 and to the driven member 42, so as to drive the screw into the forward direction.

In response to a full inward movement of the slide 56, in the opposite direction, fluid under pressure is delivered from the delivery line 54 to still another connecting line 76 that actuates a hydraulic piston and cylinder unit 78 having a plunger 80 that tightens a brake band 82 connected at the opposite end to a stationary post 84 on the engine casing. The tightening of this brake band 82 is operative to prevent rotation of the spider 24 and additional pinions 22, while the first pinion 20 rotates with the drive shaft 12. The rotation of the first bevel gear 20 thus rotates the additional bevel gears 22 which, in turn, effect rotation of the second bevel gear 28 in a direction opposite to the direction of rotation of the first bevel gear 20. This reverse directional movement is then transmitted through the planetary gear system to drive the driven member 42 in a reverse direction.

It will now be recognized that the same speed reduction is attained in both the forward and reverse directions, such being effectively controlled by the friction means in the form of the interleaved discs 72, 74 and the brake band 82. In addition, the idling brake disc 64 prevents rotation of the screw when the hydraulic control slide 56 is in the neutral position.

While various changes may be made in the detail construction, it shall be understood that such changes shall

What I claim as new and desire to protect by Letters Patent of the United States is:

1. A reversible marine transmission system comprising, in combination with a source of pressurized fluid, a drive shaft having a longitudinal bore at one end adapted to receive one end of a marine engine crank shaft, a driven member rotatably mounted over the other end of said drive shaft, spaced clutch friction discs concentrically secured in radial planes to said drive shaft, a first bevel gear secured on said drive shaft adjacent said friction discs and facing said other end of said drive shaft, a second bevel gear freely mounted on said drive shaft spaced from and facing said first bevel gear, a plurality of bevel gears in meshing engagement with both said first and second bevel gears, said plurality of bevel gears being mounted on a concentric spider having an extension extending rearwardly over said clutch friction discs, friction rings secured inwardly of said extension to project between said friction discs, a pressure slide member concentrically mounted on said drive shaft such that pressurized fluid from said source acting against said slide member causes said friction discs and friction rings to lock together and thereby rotate said spider integrally with said drive shaft, a brake band mounted around said spider extension for selectively preventing the rotation thereof and thereby causing said second bevel gear to rotate in the opposite direction, a sun gear formed integrally on one end of said second bevel gear, pinions engaging with said sun wheel and rotatably mounted on a pinion cage keyed on said driven member, a stationary ring gear encircling and engaging with said pinions, an idling brake disc secured to said pinion cage and extending beyond the circumference of said stationary ring gear, and fluid operated means for selectively actuating said slide member, said means further adapted for actuating said brake band and said brake disc.

2. A reversible marine transmission system according to claim 1 wherein said fluid operated means comprises a casing having a fluid delivery line communicating with the interior thereof under pressure, a manually controlled hollow slide supported within the casing for longitudinal movement therealong, fluid ports in said slide adapted to communicate one at a time with connecting lines for transmitting fluid under pressure to said slide member, said brake band and said brake disc.

References Cited in the file of this patent

UNITED STATES PATENTS

| | | |
|---|---|---|
| 801,517 | Fairfax | Oct. 10, 1905 |
| 1,000,406 | Heller | Aug. 15, 1911 |
| 2,018,014 | Fahrney | Oct. 22, 1935 |
| 2,358,746 | Tandler et al. | Sept. 19, 1944 |
| 2,735,310 | McFarland | Feb. 21, 1956 |

FOREIGN PATENTS

| | | |
|---|---|---|
| 264,189 | Italy | Apr. 18, 1929 |